United States Patent
Marcel (10) Patent No.: US 8,387,996 B2
(45) Date of Patent: Mar. 5, 2013

(54) VEHICLE INCLUDING EXTENDABLE AUXILIARY WHEELS

(76) Inventor: Guertin Marcel, Bromont (CA)

( * ) Notice: Subject to any disclaimer, the term of this patent is extended or adjusted under 35 U.S.C. 154(b) by 253 days.

(21) Appl. No.: 12/926,875

(22) Filed: Dec. 15, 2010

(65) Prior Publication Data

US 2011/0187069 A1 Aug. 4, 2011

(30) Foreign Application Priority Data

Jan. 29, 2010 (GB) .................................. 1001463.7

(51) Int. Cl.
*B62M 1/00* (2010.01)
(52) U.S. Cl. .................................................. 280/87.043
(58) Field of Classification Search ............ 280/87.043, 280/47.11, 87.01, 87.021, 87.041, 87.042, 280/87.05, 47.12, 1.181, 1.191, 200, 220, 280/221, 252, 124.11, 124.111, 63
See application file for complete search history.

(56) References Cited

U.S. PATENT DOCUMENTS

| | | | |
|---|---|---|---|
| 4,087,106 A * | 5/1978 | Winchell | 280/14.28 |
| 4,088,334 A * | 5/1978 | Johnson | 280/11.206 |
| 4,540,192 A * | 9/1985 | Shelton | 280/282 |
| 4,776,604 A * | 10/1988 | Valdez et al. | 280/87.041 |
| 5,090,716 A * | 2/1992 | Borden | 280/87.042 |
| 6,279,930 B1 * | 8/2001 | Chang et al. | 280/87.042 |
| 6,367,828 B1 * | 4/2002 | Mandic | 280/87.05 |
| 6,719,310 B1 * | 4/2004 | Lin | 280/87.041 |
| 6,883,814 B2 * | 4/2005 | Chuang | 280/87.041 |
| 7,172,205 B1 * | 2/2007 | Vujtech | 280/87.021 |
| 7,192,038 B2 * | 3/2007 | Tsai | 280/87.041 |
| 7,549,655 B2 * | 6/2009 | Fan | 280/87.041 |
| 7,597,334 B2 * | 10/2009 | Chen | 280/87.041 |
| 8,100,421 B2 * | 1/2012 | Bennett | 280/87.05 |
| 8,128,109 B2 * | 3/2012 | Chen | 280/87.043 |
| 8,205,895 B2 * | 6/2012 | Chen et al. | 280/87.041 |
| 2004/0032105 A1 * | 2/2004 | Tsai | 280/87.041 |
| 2004/0075230 A1 * | 4/2004 | Lin | 280/87.041 |
| 2007/0170666 A1 * | 7/2007 | Chen | 280/1.181 |
| 2008/0179849 A1 * | 7/2008 | Fan | 280/87.041 |
| 2010/0207349 A1 * | 8/2010 | Chiu et al. | 280/221 |
| 2010/0244421 A1 * | 9/2010 | Flowers | 280/755 |
| 2011/0089656 A1 * | 4/2011 | Chiu et al. | 280/87.041 |
| 2012/0043733 A1 * | 2/2012 | Tsai | 280/87.05 |
| 2012/0139203 A1 * | 6/2012 | Tedla | 280/87.042 |

* cited by examiner

*Primary Examiner* — Katy M Ebner
*Assistant Examiner* — Brodie Follman (57) ABSTRACT

A vehicle including: a vehicle body for supporting an intended user, the vehicle body defining a body front end, a body rear end and a body longitudinal axis; a front wheel and a rear wheel, the front and rear wheels being rotatably mounted to the vehicle body respectively substantially adjacent the body front and rear ends so as to be rotatable respectively about a front wheel rotation axis and a rear wheel rotation axis orientable substantially parallel to each other and substantially perpendicular to the body longitudinal axis; an auxiliary wheel mounted to the vehicle body so as to be rotatable about an auxiliary wheel rotation axis angled with respect to the front and rear wheel rotation axes; the auxiliary wheel being movable between a retracted position and an extended position relative to the vehicle body, wherein, when the vehicle is operatively supported on the ground surface by the front and rear wheels, the auxiliary wheel is closer to the ground surface in the extended position than in the retracted position.

21 Claims, 6 Drawing Sheets

FIG.9

VEHICLE INCLUDING EXTENDABLE AUXILIARY WHEELS

The present application claims priority from UK Request Application Serial Number 1001463.7 filed on Jan. 29, 2010, the contents of which is hereby incorporated by reference in its entirety.

FIELD OF THE INVENTION

The present invention relates generally to a vehicle, and more specifically to a vehicle including extendable auxiliary wheels.

BACKGROUND

Kick scooters are known in the art and are useful for allowing a user to enjoy a riding experience on a foot-propelled vehicle. Kick scooters of the prior art generally comprise two, three, four, or more wheels rotatably coupled to a chassis structure on which a user is generally standing up, and a means to manually steer the scooter.

While these prior art devices generally offer a kick scooter that allows a user to enjoy a riding experience on foot-propelled vehicles, the riding experience with these vehicles is generally limited in terms of maneuverability tricks that can be accomplished. For example, a three-wheeled kick scooter of the prior art may be particularly difficult to ride in equilibrium on only two wheels, as if riding a conventional two-wheeled kick scooter. Furthermore, it may particularly difficult for even an experienced user to achieve a full 180 degree controlled side skidding manoeuvre using these kick scooters of the prior art. Similarly, many other types of vehicles, such as skate boards and bicycles, among other possibilities, suffer from the same disadvantages.

Against this background, there exists a need for a new and improved vehicle. It is a general object of the present invention to provide a new and improved vehicle.

SUMMARY OF THE INVENTION

In a broad aspect, the invention provides a vehicle operable by an intended user on a ground surface, the vehicle comprising: a vehicle body for supporting the intended user, the vehicle body defining a body front end and a substantially opposed body rear end, the vehicle body also defining a body longitudinal axis extending between the body front and rear ends; a front wheel and a rear wheel, the front and rear wheels being rotatably mounted to the vehicle body respectively substantially adjacent the body front and rear ends so as to be rotatable respectively about a front wheel rotation axis and a rear wheel rotation axis, the front and rear wheel rotation axes being orientable substantially parallel to each other and substantially perpendicular to the body longitudinal axis; and an auxiliary wheel mounted to the vehicle body so as to be rotatable about an auxiliary wheel rotation axis, the auxiliary wheel rotation axis being angled with respect to the front and rear wheel rotation axes. The auxiliary wheel is movable between a retracted position and an extended position relative to the vehicle body, wherein, when the vehicle is operatively supported on the ground surface by the front and rear wheels, the auxiliary wheel is closer to the ground surface in the extended position than in the retracted position.

Advantageously, the proposed vehicle facilitates the execution of some stunts that requires skidding of the rear wheel, while remaining close to conventional operation in other circumstances. In some embodiments of the invention, the proposed auxiliary wheel does not add significant cost to the manufacturing cost of the vehicle. Also, the proposed auxiliary wheel and related structures can be manufactured so that they are relatively robust at relatively low costs.

In some embodiments of the invention, the vehicle further comprises an auxiliary wheel carriage to which the auxiliary wheel is rotatably mounted, the auxiliary wheel carriage being pivotally mounted to the vehicle body so as to be pivotable about a carriage pivot axis between a carriage retracted configuration and a carriage extended configuration, the auxiliary wheel being in the retracted position when the auxiliary wheel carriage is in the carriage retracted configuration and the auxiliary wheel being in the extended position when the auxiliary wheel carriage is in the carriage extended configuration.

Typically, but not exclusively, a biasing element biases the auxiliary wheel carriage toward the carriage retracted configuration.

In some embodiments of the invention, the auxiliary wheel carriage defines a pedal area for allowing the intended user to press thereonto to move the auxiliary wheel carriage from the carriage retracted configuration to the carriage extended configuration.

In some embodiments of the invention, the auxiliary wheel carriage defines a carriage proximal end and a substantially opposed carriage distal end, the auxiliary wheel being rotatably mounted to the auxiliary wheel carriage substantially spaced apart from the carriage proximal end, the auxiliary wheel carriage being pivotally mounted to the vehicle body substantially adjacent the carriage proximal end.

In some embodiments of the invention, the carriage distal end is laterally further away from the body longitudinal axis than the carriage proximal end.

In some embodiments of the invention, the carriage pivot axis is substantially parallel to the auxiliary wheel rotation axis.

A vehicle as defined in claim 1, wherein the auxiliary wheel rotation axis intersects the body longitudinal axis at a location behind the auxiliary wheel.

In some embodiments of the invention, the auxiliary wheel carriage is retrofitable to an existing vehicle.

In some embodiments of the invention, the vehicle comprises another auxiliary wheel mounted to the vehicle body so as to be rotatable about another auxiliary wheel rotation axis angled with respect to the front and rear wheel rotation axes, the auxiliary wheel rotation axes being angled with respect to each other.

In some embodiments of the invention, a rear axis-to-auxiliary axis angle between the rear and auxiliary wheel rotation axes is fixed.

In some embodiments of the invention, the auxiliary wheel is mounted to the vehicle body substantially adjacent the body rear end.

In some embodiments of the invention, the vehicle body defines a platform allowing the intended user to stand thereonto when operating the vehicle.

In some embodiments of the invention, the front wheel is steerable by the intended user by selectively turning the front wheel to change an orientation of the front wheel rotation axis with respect to the body longitudinal axis. For example, the vehicle includes a handlebar assembly operatively coupled to the front wheel for selectively changing the orientation of the front wheel rotation axis with respect to the body longitudinal axis.

In some embodiments of the invention, the vehicle further comprises another front wheel, the vehicle body including a skate board truck to which the front wheels are both mounted so as to be rotatable about the front wheel rotation axis.

In some embodiments of the invention, the rear wheel rotation axis is fixed with respect to the body longitudinal axis.

In some embodiments of the invention, the auxiliary wheel is laterally offset with respect to the rear wheel.

In another broad aspect, the invention provides a method using an auxiliary wheel rotatable about an auxiliary wheel rotation axis to skid the rear end of a human powered vehicle rolling on a ground surface, the human powered vehicle having at least one front wheel and at least one substantially opposed rear wheel rotatable respectively about a front wheel rotation axis and rear wheel rotation axis, the method being performed by an intended user having a weight and propulsing the human powered vehicle, the method comprising: propulsing the vehicle along a substantially rectilinear trajectory in which the front and rear wheels rotate about the front and rear wheel rotation axes with the front and rear wheel rotation axes substantially parallel to each other; contacting on the ground surface the auxiliary wheel with the auxiliary wheel rotation axis angled with respect to the front and rear wheel rotation axes, the auxiliary wheel being contacted on the ground surface substantially adjacent the rear end of the human powered vehicle; and transferring at least partially the weight of the intended user on the auxiliary wheel. By transferring at least partially the weight on the auxiliary wheel, the intended user causes forces to be exerted on the human powered vehicle that skid the rear end in a direction angled with respect to the rectilinear trajectory.

In some embodiments of the invention, the method is performed using the above-described vehicle.

In some embodiments of the invention, the further comprises turning the front wheel with respect to the rear wheel substantially simultaneously to transferring at least partially the weight of the intended user on the auxiliary wheel. For example, the front wheel is turned toward the auxiliary wheel. In yet other embodiments, the further comprises lifting the at least one rear wheel from the ground surface.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
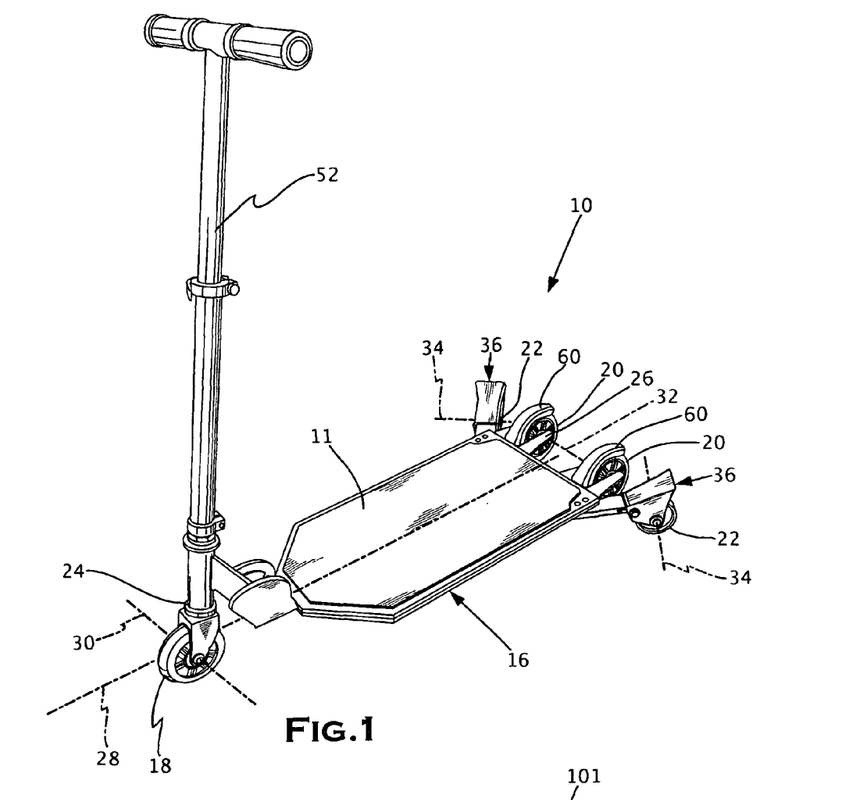
FIG. 1, in perspective view, illustrates a vehicle in accordance with an embodiment of the present invention.
Figure 2:
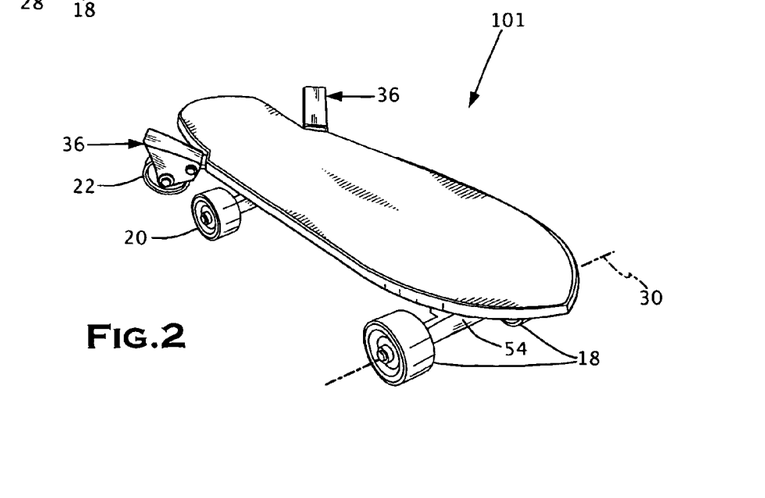
FIG. 2, in perspective view, illustrates a vehicle in accordance with an alternative embodiment of the present invention.
Figure 5:
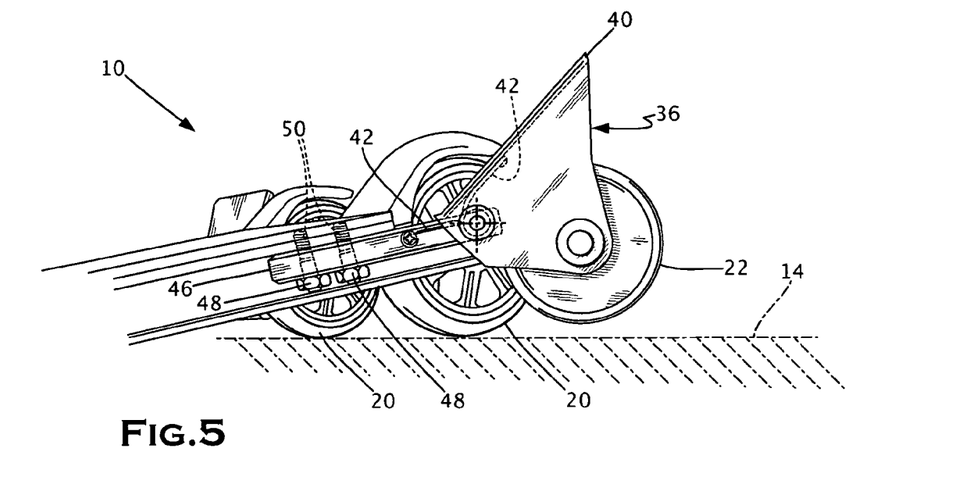
FIG. 5, in an alternative partial perspective view, illustrates the vehicle shown in FIGS. 1, 3 and 4 with an auxiliary wheel thereof in a retracted position.
Figure 6:
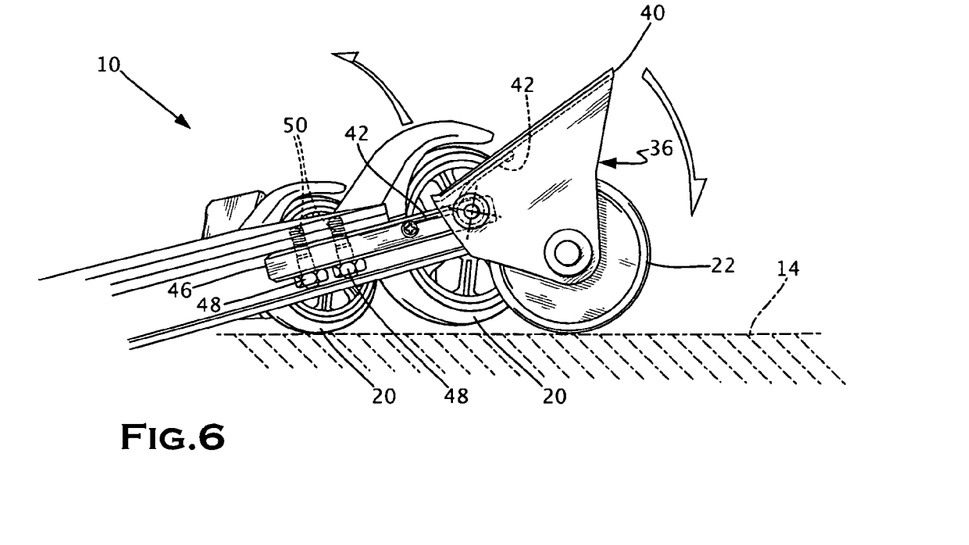
FIG. 6, in a partial perspective view, illustrates the vehicle shown in FIGS. 1 and 3 to 5 with the auxiliary wheel in an extended position.

Referring to FIG. 1, there is shown a vehicle 10 operable by an intended user 12 (shown in FIGS. 7 and 8) on a ground surface 14 (shown in FIGS. 5 and 6). In FIG. 1, the vehicle is shown in the form of a kick scooter defining a platform 11 allowing the intended user to stand thereonto when operating the vehicle 10. However, in alternative embodiments of the invention, the vehicle is any other suitable vehicle, such as a skateboard 101, shown in FIG. 2, or a bicycle (not shown in the drawings), among other possibilities. The vehicle 10 is typically a human powered vehicle. However, in some embodiments of the invention, the vehicle 10 is provided with a motor (not shown in the drawings).

Returning to FIG. 1 the vehicle 10 includes a vehicle body 16 for supporting the intended user 12, a front wheel 18 and a rear wheel 20, the front and rear wheels 18 and 20 being rotatably mounted to the vehicle body 16. An auxiliary wheel 22 is also mounted to the vehicle body 16 and movable between a retracted position and an extended position relative to the vehicle body 16. When the vehicle 10 is operatively supported on the ground surface 14 by the front and rear wheels 18 and 20, the auxiliary wheel 22 is closer to the ground surface 14 in the extended position, shown in FIG. 5 for example, than in the retracted position, shown in FIG. 6.

More specifically, as shown in FIG. 1, the vehicle body 16 defines a body front end 24 and a substantially opposed body rear end 26. The vehicle body also defines a body longitudinal axis 28 extending between the body front and rear ends 24 and 26. The front and rear wheels 18 and 20 are rotatably mounted to the vehicle body 16 respectively substantially adjacent the body front and rear ends 24 and 26 so as to be rotatable respectively about a front wheel rotation axis 30 and a rear wheel rotation axis 32. The front and rear wheel rotation axes 30 and 32 are orientable substantially parallel to each other and substantially perpendicular to the body longitudinal axis 28. In some embodiments of the invention, one, both or none of the front and rear wheels 18 and 20 are steerable with respect to the vehicle body 16, but in all cases, the front and rear wheels 18 and 20 have an orientation in which the front and rear wheel rotation axes 30 and 32 are parallel to each other, thereby allowing substantially rectilinear movement of the vehicle 10 along the ground surface 14 in a direction substantially parallel to the body longitudinal axis 28.

While only one front wheel 18 and one rear wheel 20 have been included in the above description, the reader skilled in the art will readily appreciate that any suitable number of front and rear wheels can be included in the vehicle 10. For example, the vehicle 10 shown in FIG. 1 includes a pair of rear wheels 20 and a single front wheel 18. The vehicle 101 shown in FIG. 2 includes a pair of rear wheels 20, only one of which is visible in FIG. 2, and a pair of front wheels 18. Also, typically, but not exclusively, the auxiliary wheel 22 is laterally offset with respect to the rear wheel 20.

The auxiliary wheel 22 is mounted to the vehicle body 16 so as to be rotatable about an auxiliary wheel rotation axis 34, the auxiliary wheel rotation axis 34 being angled with respect to the front and rear wheel rotation axes 30 and 32. Typically, a pair of auxiliary wheels 22 are mounted to the vehicle body 16 so as to be each rotatable about a respective auxiliary wheel rotation axis 34 angled with respect to the front and rear wheel rotation axes 30 and 32, the auxiliary wheel rotation axes 34 being angled with respect to each other.

The auxiliary wheels 22 are also typically mounted in a laterally symmetrical manner with respect to the vehicle body 16 with the auxiliary wheel rotation axis 34 oriented to intersect the body longitudinal axis 28 at a location behind the auxiliary wheels 22. In some embodiments of the invention, a rear axis-to-auxiliary axis angle 35 between the rear and auxiliary wheel rotation axes 32 and 34 is fixed. However, in alternative embodiments of the invention, the rear axis-to-auxiliary axis angle 35 is freely variable or is selectively adjustable by the intended user 12.

Figure 3:
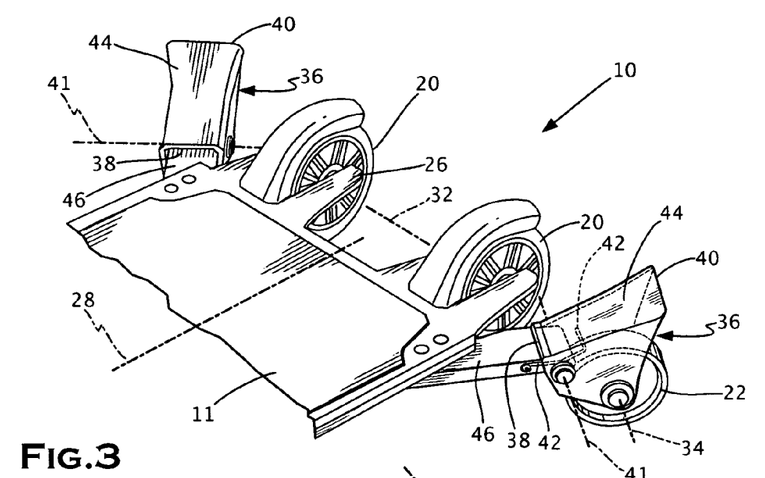
FIG. 3, in a partial perspective view, illustrates the vehicle shown in FIG. 1.
Figure 4:
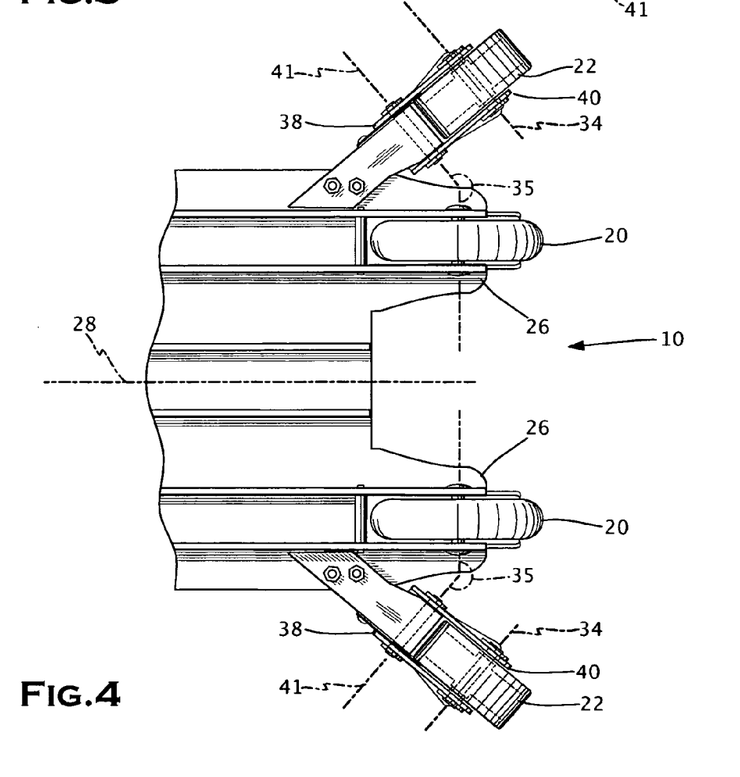
FIG. 4, in a partial bottom plan view, illustrates the vehicle shown in FIGS. 1 and 3.

Referring to FIGS. 3 and 4, typically, each auxiliary wheel 22 in mounted to the vehicle body 16 substantially adjacent the body rear end 26 through an auxiliary wheel carriage 36 defining a carriage proximal end 38 and a substantially opposed carriage distal end 40. The auxiliary wheel 22 is rotatably mounted to the auxiliary wheel carriage 36 substantially spaced apart from the carriage proximal end 38. The auxiliary wheel carriage 36 is pivotally mounted to the vehicle body 16 substantially adjacent the carriage proximal end 38 so as to be pivotable about a carriage pivot axis 41 substantially parallel to the auxiliary wheel rotation axis 34 between a carriage retracted configuration, shown in FIG. 5, and a carriage extended configuration, shown in FIG. 6. The auxiliary wheel 22 is in the retracted position when the auxiliary wheel carriage 36 is in the carriage retracted configuration and the auxiliary wheel 22 is in the extended position when the auxiliary wheel carriage 36 is in the carriage extended configuration. Typically, the carriage distal end 40 is laterally further away from the body longitudinal axis 28 than the carriage proximal end 38.

In typical embodiments of the invention, a biasing element, such as the spring 42, shown for example in FIGS. 5 and 6, is biasing the auxiliary wheel carriage 36 toward the carriage retracted configuration. The spring 42 is a torsion spring wound around the axle about which the auxiliary wheel carriage 36 pivots and abutting against the auxiliary wheel carriage 36 and the vehicle body 12 so as to bias the auxiliary wheel carriage 36 toward the carriage retracted configuration. However, in alternative embodiments of the invention, any other suitable biasing element is used. Also, the auxiliary wheel carriage 36 defines a pedal area 44 for allowing the intended user 12 to press thereonto to move the auxiliary wheel carriage 36 from the carriage retracted configuration to the carriage extended configuration. For example, the pedal area 44 is defined by a substantially flat surface of the auxiliary wheel carriage 36 oriented generally upwardly.

In some embodiments of the invention, the auxiliary wheel carriage 36 is provided at the free end of a spacing element 46 extending from the remainder of the vehicle body 16. This configuration positions the auxiliary wheel 22 at a relatively large lateral distance from the body longitudinal axis 28 and therefore improves the equilibrium of the vehicle 10. In some embodiments of the invention, the spacing element 46, the auxiliary wheel carriage 36 or both the spacing element 46 and the auxiliary wheel carriage 36 are removable attachable to the vehicle body 16 so that they can be removed when the intended user 12 does not wish to use them. As shown in FIGS. 5 and 6, this can be achieved, for example, by attaching the spacing element 46 to the reminder of the vehicle body 16 using bolts 48 threaded in suitable apertures 50. In some embodiments of the invention, this same structure, or similar ones, allow retrofitting the proposed auxiliary wheel carriage 36 to an existing vehicle 10.

Many configurations are possible for the front and rear wheels 18 and 20. For example, in some embodiments of the invention, the front wheel 18 is steerable by the intended user 12 by selectively turning the front wheel 18 to change an orientation of the front wheel rotation axis 30 with respect to the body longitudinal axis 28. In a specific example, as seen for example in FIG. 1, this is achieved in a vehicle 10 comprising a handlebar assembly 52 operatively coupled to the front wheel 18 for selectively changing the orientation of the front wheel rotation axis 30 with respect to the body longitudinal axis 28. In another example, such as in the vehicle 101 shown in FIG. 2, the vehicle 101 includes two front wheels 18 and the vehicle body including a conventional skate board truck 54 to which the front wheels 18 are both mounted so as to be rotatable about a common front wheel rotation axis 30. In some embodiments of the invention, such as in the vehicle 10, the rear wheel rotation axis 32 is fixed with respect to the body longitudinal axis 28.

The vehicle 10 may also include many conventional features, such as, for example, a brake 60 formed of a deformable element that is deformable to abut against the rear wheel 20 to slow down or stop the vehicle 10.

In use, the vehicle 10 is usable in a conventional manner. However, when an intended user wishes to perform some specific stunts, the auxiliary wheel 22 is used to skid the rear end 56 of the vehicle 10 when rolling on the ground surface 14. The method performed by the intended user 12 to achieve this result uses the weight of the intended user 12 who is propulsing the vehicle 10.

Figure 7:
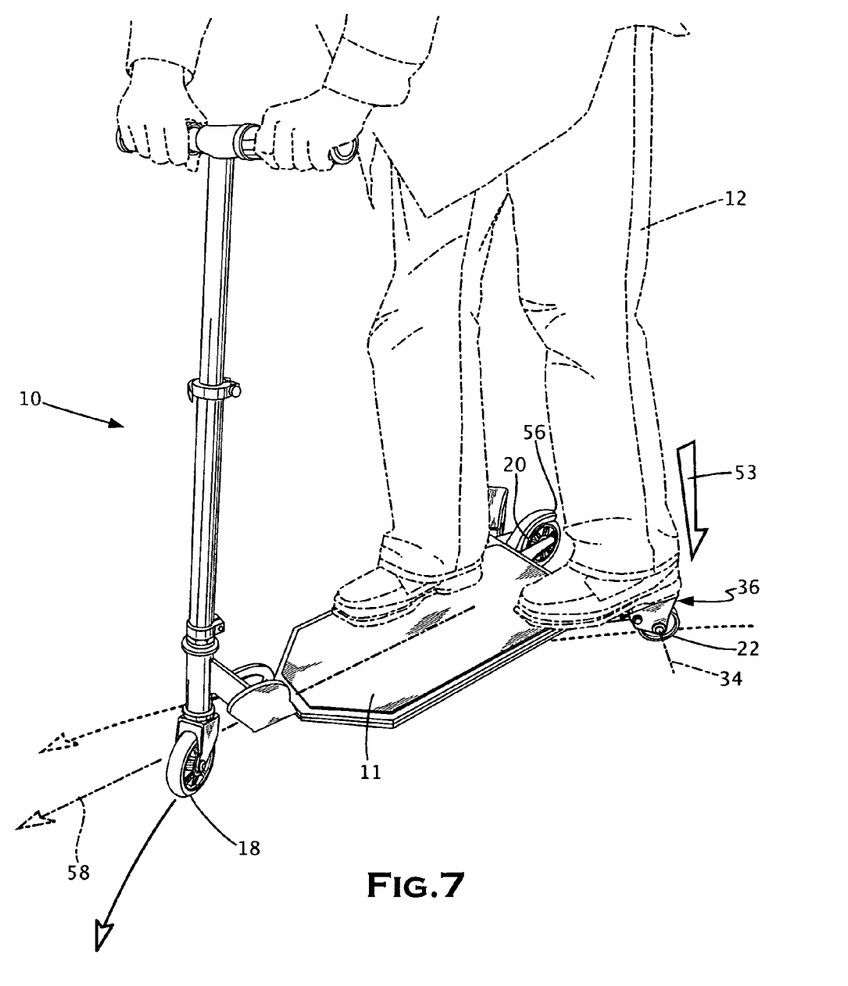
FIG. 7, in an environmental perspective view, illustrates a step in the operation of the vehicle shown in FIGS. 1 and 3 to 6.

With reference to FIG. 7, the method includes propulsing the vehicle along a substantially rectilinear trajectory 58. In the substantially rectilinear trajectory, the front and rear wheels 18 and 20 rotate about the front and rear wheel rotation axes 30 and 32 with the front and rear wheel rotation axes 30 and 32 substantially parallel to each other, in the configuration shown in FIG. 1. Afterwards, the method includes contacting on the ground surface 14 the auxiliary wheel 22 with the auxiliary wheel rotation axis 34 angled with respect to the front and rear wheel rotation axes 30 and 32, as indicated by the arrow 53. The auxiliary wheel 22 is typically contacted on the ground surface 14 substantially adjacent the rear end 56 of the vehicle 10. Afterwards, the method includes transferring at least partially the weight of the intended user 12 on the auxiliary wheel 22. By transferring at least partially the weight on the auxiliary wheel 22, the intended user causes forces to be exerted on the vehicle 10 that skid the rear end 56 in a direction angled with respect to the rectilinear trajectory 58.

Figure 8:
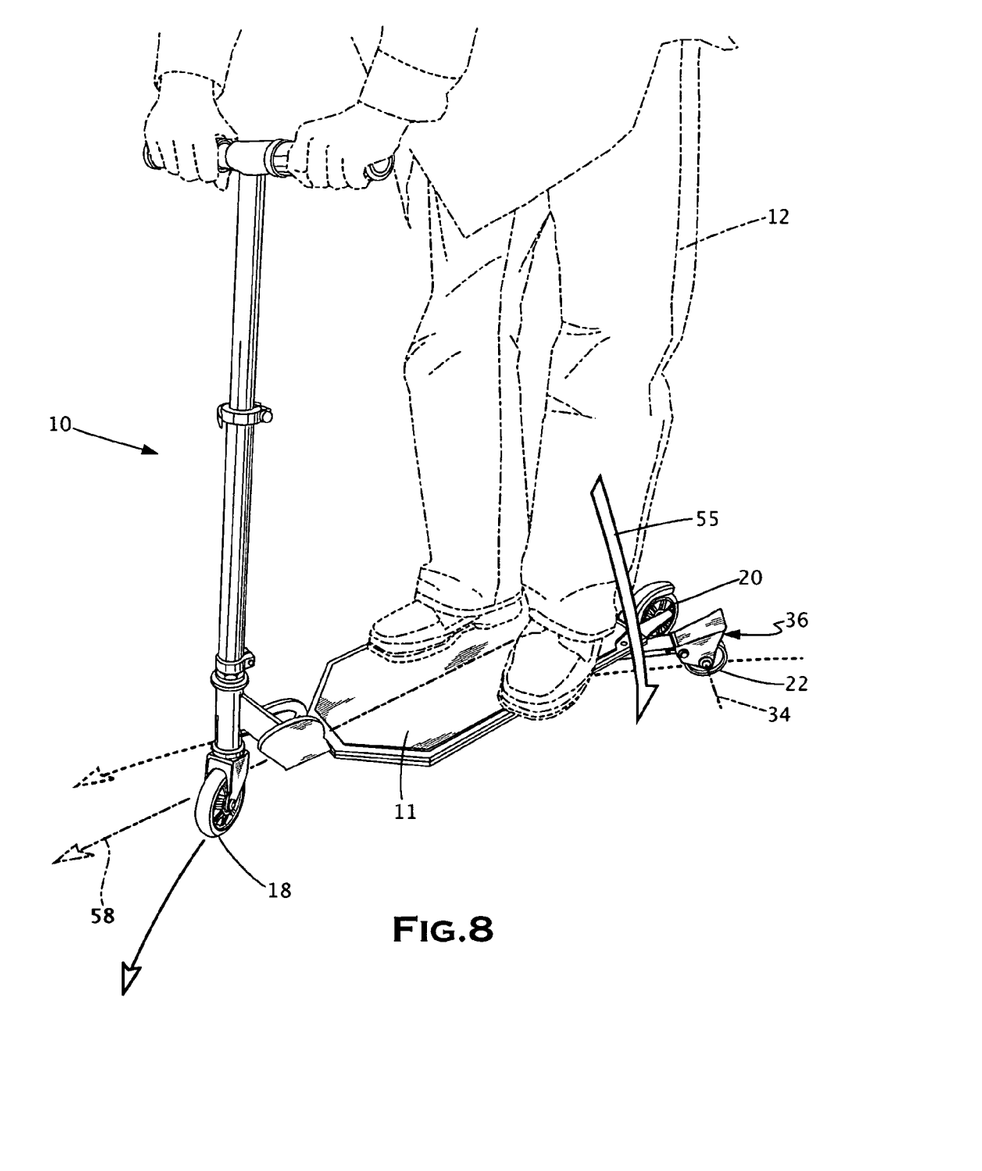
FIG. 8, in an environmental perspective view, illustrates another step in the operation of the vehicle shown in FIGS. 1 and 3 to 7.

Contacting on the ground surface 14 the auxiliary wheel 22 can be performed by tilting the vehicle 10, as shown in FIG. 8 and indicated by the arrow 55, by moving the auxiliary wheel carriage 36 from the carriage retracted configuration to the carriage extended configuration, as shown in FIG. 7, or through a combination of these two actions.

To enhance the effect, the user may turn the front wheel 18 with respect to the rear wheel 20 substantially simultaneously to transferring at least partially the weight on the auxiliary wheel 22. For example, the front wheel 18 is turned toward the auxiliary wheel 22 so that the vehicle 10 turns into the new trajectory defined buy the above-described actions. In some embodiments of the invention, the force exerted on the auxiliary wheel 22, and consequently on the auxiliary wheel carriage 36, is large enough to lift from the ground surface 14 one or more rear wheels 22, thereby facilitating the skidding action.

Figure 9:
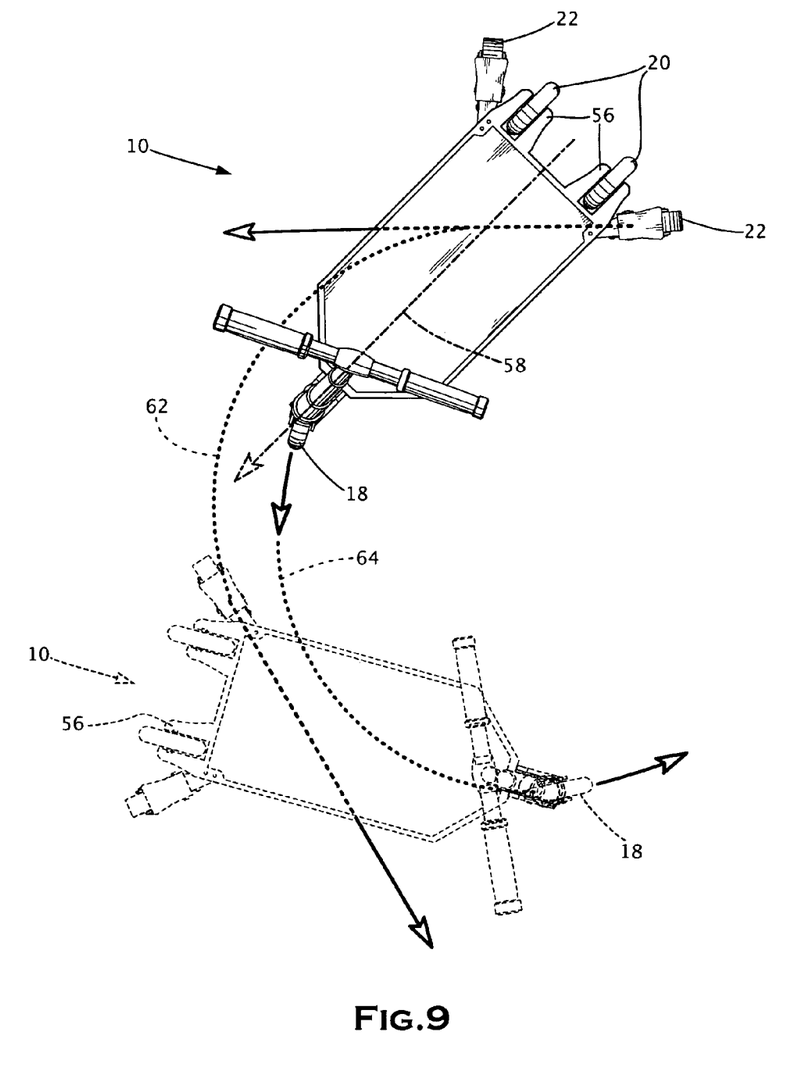
FIG. 9, in a top plan view, illustrates successive positions and orientations of the of the vehicle shown in FIGS. 1 and 3 to 8 when operated according to the steps illustrated in FIGS. 7 and 8.

FIG. 9 illustrates the resulting trajectory of the front wheel 18, indicated by reference numeral 64, and of the auxiliary wheel 22, indicated by reference numeral 62. As clearly visible from this Figure, this results in a global trajectory of the vehicle 10 in which the rear end 56 is rotated with respect to the front wheel 18 with a radius of curvature that is much smaller than would be the case of the auxiliary wheel 22 was not used.

Although the present invention has been described hereinabove by way of preferred embodiments thereof, it can be modified, without departing from the spirit and nature of the subject invention as defined in the appended claims.

What is claimed is:

1. A vehicle operable by an intended user on a ground surface, said vehicle comprising:
    a vehicle body for supporting said intended user, said vehicle body defining a body front end and a substantially opposed body rear end, said vehicle body also defining a body longitudinal axis extending between said body front and rear ends;
    a front wheel and a rear wheel, said front and rear wheels being rotatably mounted to said vehicle body respectively substantially adjacent said body front and rear ends so as to be rotatable respectively about a front wheel rotation axis and a rear wheel rotation axis, said front and rear wheel rotation axes being orientable substantially parallel to each other and substantially perpendicular to said body longitudinal axis; and
    an auxiliary wheel mounted to said vehicle body so as to be rotatable about an auxiliary wheel rotation axis, said auxiliary wheel rotation axis being angled with respect to said front and rear wheel rotation axes;
    said auxiliary wheel being movable between a retracted position and an extended position relative to said vehicle body, wherein, when said vehicle is operatively supported on said ground surface by said front and rear wheels, said auxiliary wheel is closer to said ground surface in said extended position than in said retracted position.

2. A vehicle as defined in claim 1, further comprising an auxiliary wheel carriage to which said auxiliary wheel is rotatably mounted, said auxiliary wheel carriage being pivotally mounted to said vehicle body so as to be pivotable about a carriage pivot axis between a carriage retracted configuration and a carriage extended configuration, said auxiliary wheel being in said retracted position when said auxiliary wheel carriage is in said carriage retracted configuration and said auxiliary wheel being in said extended position when said auxiliary wheel carriage is in said carriage extended configuration.

3. A vehicle as defined in claim 2, further comprising a biasing element biasing said auxiliary wheel carriage toward said carriage retracted configuration.

4. A vehicle as defined in claim 3, wherein said auxiliary wheel carriage defines a pedal area for allowing said intended user to press thereonto to move said auxiliary wheel carriage from said carriage retracted configuration to said carriage extended configuration.

5. A vehicle as defined in claim 2, wherein said auxiliary wheel carriage defines a carriage proximal end and a substantially opposed carriage distal end, said auxiliary wheel being rotatably mounted to said auxiliary wheel carriage substantially spaced apart from said carriage proximal end, said auxiliary wheel carriage being pivotally mounted to said vehicle body substantially adjacent said carriage proximal end.

6. A vehicle as defined in claim 5, wherein said carriage distal end is laterally further away from said body longitudinal axis than said carriage proximal end.

7. A vehicle as defined in claim 2, wherein said carriage pivot axis is substantially parallel to said auxiliary wheel rotation axis.

8. A vehicle as defined in claim 1, wherein said auxiliary wheel rotation axis intersects said body longitudinal axis at a location behind said auxiliary wheel.

9. A vehicle as defined in claim 1, further comprising another auxiliary wheel mounted to said vehicle body so as to be rotatable about another auxiliary wheel rotation axis angled with respect to said front and rear wheel rotation axes, said auxiliary wheel rotation axes being angled with respect to each other.

10. A vehicle as defined in claim 1, wherein a rear axis-to-auxiliary axis angle between said rear and auxiliary wheel rotation axes is fixed.

11. A vehicle as defined in claim 1, wherein said auxiliary wheel is mounted to said vehicle body substantially adjacent said body rear end.

12. A vehicle as defined in claim 1, wherein said vehicle body defines a platform allowing said intended user to stand thereonto when operating said vehicle.

13. A vehicle as defined in claim 1, wherein said front wheel is steerable by said intended user by selectively turning said front wheel to change an orientation of said front wheel rotation axis with respect to said body longitudinal axis.

14. A vehicle as defined in claim 13, further comprising a handlebar assembly operatively coupled to said front wheel for selectively changing said orientation of said front wheel rotation axis with respect to said body longitudinal axis.

15. A vehicle as defined in claim 13, further comprising another front wheel, said vehicle body including a skate board truck to which said front wheels are both mounted so as to be rotatable about said front wheel rotation axis.

16. A vehicle as defined in claim 13, wherein said rear wheel rotation axis is fixed with respect to said body longitudinal axis.

17. A vehicle as defined in claim 1, wherein said auxiliary wheel is laterally offset with respect to said rear wheel.

18. A method using an auxiliary wheel rotatable about an auxiliary wheel rotation axis to skid the rear end of a human powered vehicle rolling on a ground surface, said human powered vehicle having at least one front wheel and at least one substantially opposed rear wheel rotatable respectively about a front wheel rotation axis and a rear wheel rotation axis, said method being performed by an intended user having a weight and propulsing said human powered vehicle, said method comprising:
    propulsing said vehicle along a substantially rectilinear trajectory in which said front and rear wheels rotate about said front and rear wheel rotation axes with said front and rear wheel rotation axes substantially parallel to each other;
    contacting on said ground surface said auxiliary wheel with said auxiliary wheel rotation axis angled with respect to said front and rear wheel rotation axes, said auxiliary wheel being contacted on said ground surface substantially adjacent said rear end of said human powered vehicle; and
    transferring at least partially said weight of said intended user on said auxiliary wheel;
    whereby, by transferring at least partially said weight on said auxiliary wheel, said intended user causes forces to be exerted on said human powered vehicle that skid said rear end in a direction angled with respect to said rectilinear trajectory.

19. A method as defined in claim 18, further comprising turning said front wheel with respect to said rear wheel substantially simultaneously to transferring at least partially said weight of said intended user on said auxiliary wheel.

20. A method as defined in claim 19, wherein said front wheel is turned toward said auxiliary wheel.

21. A method as defined in claim 18, further comprising lifting said at least one rear wheel from said ground surface.

* * * * *